United States Patent
Meder

(10) Patent No.: US 9,984,101 B2
(45) Date of Patent: May 29, 2018

(54) DATABASE MIGRATION OF SCHEMAS ENFORCED BY APPLICATIONS WITHOUT DOWNTIME

(71) Applicant: Adobe Systems Incorporated, San Jose, CA (US)

(72) Inventor: Nils Meder, Hamburg (DE)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 465 days.

(21) Appl. No.: 14/626,741

(22) Filed: Feb. 19, 2015

(65) Prior Publication Data

US 2016/0246821 A1   Aug. 25, 2016

(51) Int. Cl.
*G06F 17/30*   (2006.01)

(52) U.S. Cl.
CPC ................ *G06F 17/303* (2013.01)

(58) Field of Classification Search
CPC ............ G06F 17/303; G06F 17/30575; G06F 17/30297
USPC ....................................................... 707/610
See application file for complete search history.

(56) References Cited

U.S. PATENT DOCUMENTS

| | | | | |
|---|---|---|---|---|
| 7,353,231 B1 * | 4/2008 | Eslambolchi | ..... | G06F 17/30241 707/602 |
| 9,619,490 B2 * | 4/2017 | Aron | ................ | G06F 17/30289 |
| 2006/0136471 A1 * | 6/2006 | Ge | ................... | G06F 17/30297 |
| 2012/0166492 A1 * | 6/2012 | Bikkula | ................ | G06F 17/303 707/803 |
| 2012/0331013 A1 * | 12/2012 | Vickers | ............. | G06F 17/30557 707/804 |
| 2015/0248403 A1 * | 9/2015 | Pazdziora | ............. | G06F 17/303 707/809 |
| 2015/0248404 A1 * | 9/2015 | Pazdziora | ............. | G06F 17/303 707/809 |
| 2015/0347541 A1 * | 12/2015 | Holmes | ............. | G06F 17/30563 707/602 |
| 2016/0164722 A1 * | 6/2016 | Zhu | ...................... | H04L 41/082 709/221 |

* cited by examiner

*Primary Examiner* — Thanh-Ha Dang

(74) *Attorney, Agent, or Firm* — Wolfe-SBMC

(57) ABSTRACT

Techniques supporting database migration of schemas enforced by applications without downtime is described. In examples, a method of migrating databases is described to comply with schemas enforced by one or more applications without downtime such that the data remains accessible to the one or more applications. A transformation is initiated, by a schema migration module implemented by one or more computing devices, of a first database in compliance with a first schema into a second database in compliance with a second schema. The first and second schemas have mechanisms for storage and retrieval of data that is modeled using at least one technique other than a relational model. Access of the one or more applications is controlled by the schema migration module to the first and second databases during the transformation by limiting read operation access to the second database and write operation access to the first database during the transformation and synchronizing write operations made to the first database by replaying the write operations with corresponding transformed data into the second database.

20 Claims, 7 Drawing Sheets

500 —

502
Initiate a transformation, by a schema migration module implemented by one or more computing devices, of a first database in compliance with a first schema into a second database in compliance with a second schema, the first and second schemas having mechanisms for storage and retrieval of data that is modeled using at least one technique other than a relational model

504
Control access of the one or more applications by the schema migration module to the first and second databases during the transformation by limiting read operation access to the second database and write operation access to the first database during the transformation; and synchronizing write operations made to the first database by replaying the write operations with corresponding transformed data into the second database

506
Responsive to completion of the transformation of the data between the first and second databases, cease the control of the access by the schema migration module to permit read and write access by the one or more applications to the second database

*Fig. 5*

DATABASE MIGRATION OF SCHEMAS ENFORCED BY APPLICATIONS WITHOUT DOWNTIME

BACKGROUND

With the movement of companies from desktop products to cloud-based services, availability and reliability are business critical requirements. Over the lifetime of a cloud service its functionality, usage and scale changes and often involves changes in the data model used to support the cloud service. One technique used to maintain this data for applications of the cloud service is referred to as a Not Only Structured Query Language (NoSQL) database.

NoSQL databases typically do not enforce a schema, but rather rely on the application to enforce a well-defined schema, itself. At some point, however, a schema enforced by the application may no longer fulfill the requirements of an application anymore (e.g., due to updates and so on) and therefore a new schema is designed to support these requirements. In the cloud example above, changing from one schema into another involves multiple components of a worldwide deployment. The old data from a previous schema, for instance, is migrated to the new schema and application servers are made resilient to both models. In a cloud environment, this affects hundreds of database and application servers and may affect millions of users worldwide. Accordingly, conventional techniques to migrate the schema that involve service downtime, data loss while the migration is done, and so on are no longer acceptable, which often prevents a schema change and limits the scalability of those applications of the service.

SUMMARY

Techniques supporting database migration of schemas enforced by applications without downtime is described. In one or more examples, a method of migrating databases is described to comply with schemas enforced by one or more applications without downtime such that the data remains accessible to the one or more applications. A transformation is initiated, by a schema migration module implemented by one or more computing devices, of a first database in compliance with a first schema into a second database in compliance with a second schema. The first and second schemas have mechanisms for storage and retrieval of data that is modeled using at least one technique other than a relational model. Access of the one or more applications is controlled by the schema migration module to the first and second databases during the transformation by limiting read operation access to the second database and write operation access to the first database during the transformation and synchronizing write operations made to the first database by replaying the write operations with corresponding transformed data into the second database. Responsive to completion of the transformation of the data between the first and second databases, the control of the access is ceased by the schema migration module to permit read and write access by the one or more applications to the second database.

In one or more examples, a system is described of migrating document stores to comply with schemas enforced by one or more applications without downtime such that the data remains accessible to the one or more applications. The system includes a first database system having one or more document stores configured to encapsulate and encode data as a plurality of documents having self-describing hierarchical tree data structures in compliance with a first schema enforced by the one or more applications. The system also includes a second database system having one or more document stores configured to encapsulate and encode data as a plurality of documents having self-describing hierarchical tree data structures in compliance with a second schema enforced by the one or more applications. The system further includes a schema migration module, implemented by one or more computing devices, to control access of the one or more application to the first and second databases during transformation of the data in the one or more document stores of the first database system to the one or more document stores of the second database system by limitation of read operation access to the second database system and write operation access to the first database system during the transformation and synchronization of write operations made to the first database system by replaying the write operations with corresponding transformed data into the second database system using an operational log.

In one or more examples, a system is described of migrating data in an environment having a plurality of regions of database systems from compliance with a first schema to a second schema enforced by one or more applications without downtime. The system includes a plurality of database systems associated with corresponding geographic regions, each of the database systems having mechanisms for storage and retrieval of data that is modeled using at least one technique other than a relational model. The system also includes a schema migration module, implemented by one or more computing devices, to transform the plurality of database systems from compliance with the first schema to compliance with the second schema sequentially for each said geographic location and control access of the one or more applications during the transformation through limitation of read operation access to the database systems in compliance with the second schema and write operation access to the database system in compliance with the first schema.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 5 is a flow diagram depicting a procedure in an example implementation in which migration of schemas of databases enforced by applications is performed without downtime.

DETAILED DESCRIPTION

Overview

Conventional techniques used to migrate databases that did not enforce schemas by the database itself typically required downtime to perform the migration, could involve loss of data that is generated while the migration is performed, and so on. Schemas are a structure described in a formal language supported by a database management system and refers to the organization of data as a blueprint of how a database is constructed. Consequently, these conventional techniques involve significant drawbacks that often resulted in avoidance of the schema change and thus loss of functionality that may be made available via the change.

Data migration techniques involving schemas enforced by applications are described. In one or more examples, migration is initiated for databases that have mechanisms for storage and retrieval of data that is modeled using at least one technique other than a relational model, such as databases using a document mechanism, a column mechanism, a key-value mechanism, a graph mechanism, a multi-model mechanism, Not Only Structured Query Language (NoSQL) databases, and so forth. Thus, these models include data within the database without use of predefined relations (e.g., tables) defined by the database, itself. For a document mechanism, for instance, the transformation may involve document stores configured to encapsulate and encode data as a plurality of documents having self-describing hierarchical tree data structures and therefore the transformation includes transformation of the plurality of documents.

During this transformation, techniques are employed to keep the data in the databases available to applications that rely on the data. For example, read access is permitted to the transformed data in the transformed databases while write access is permitted to the database that is yet to be transformed. Additionally, synchronization techniques are employed to "keep up with changes," such as to employ an operation log that describes write operations made to the database that is yet to be transformed that are then replayed to the transformed database using transformed data. In this way, the migration is performed without downtime and remain synchronized and thus may do so in the background and conserve computing device, storage, and network resources of an environment that employs these database types. Further discussion of these and other examples is described in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
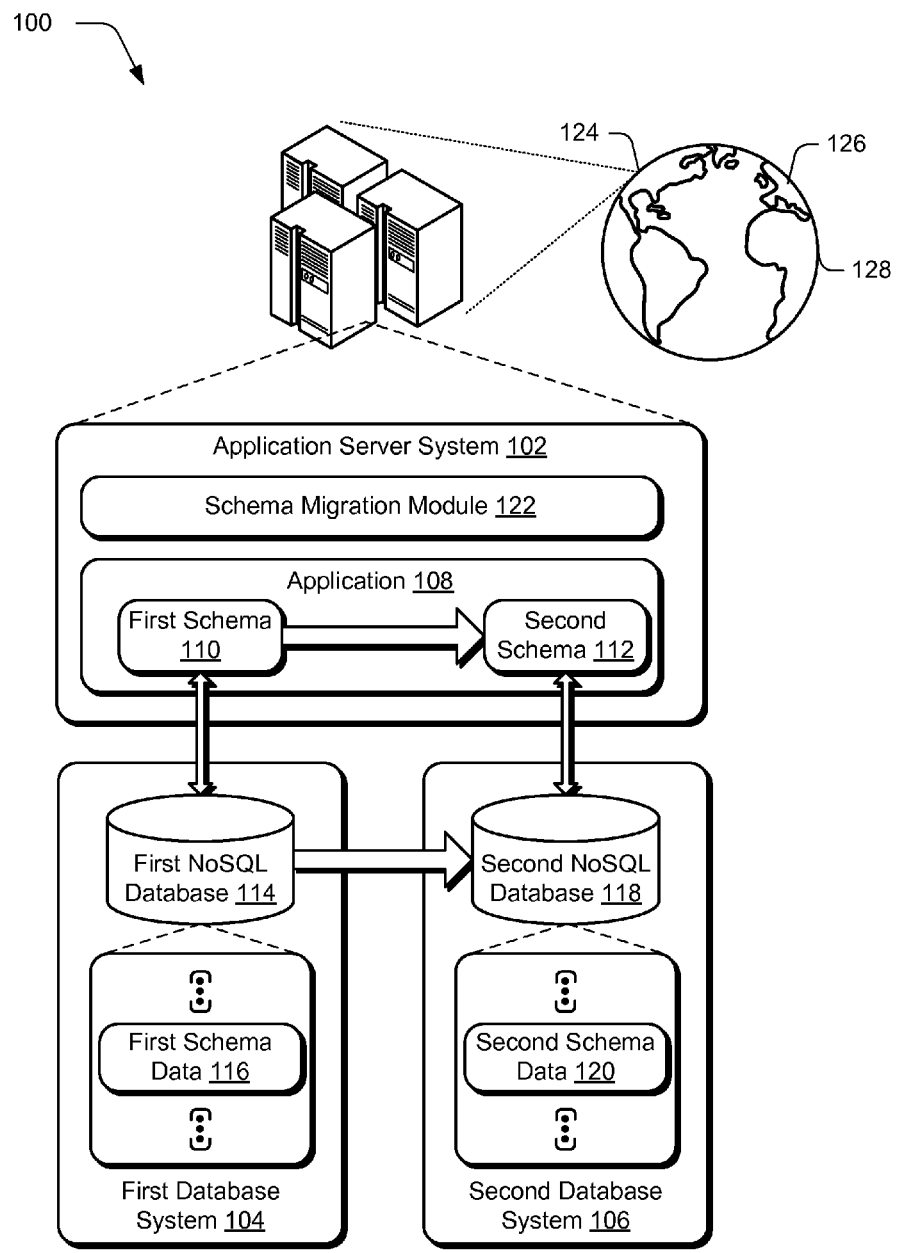
FIG. 1 is an illustration of an environment in an example implementation that is operable to employ database migration techniques described herein.

FIG. 1 is an illustration of an environment 100 in an example implementation that is operable to employ database migration techniques described herein. The illustrated environment 100 includes an application server system 102 and first and second database systems 104, 106 that store data for use by an application 108, e.g., as part of a web service "in the cloud." The application server system 102, for instance, may be implemented using one or more computing devices, such as part of a server farm. The first and second database systems 104, 106 may likewise be implemented using a variety of hardware components, such as data storage devices, memory controllers, computing devices, and so on. A variety of other examples are also contemplated, further discussion of which is described in relation to FIG. 7.

The application 108 is illustrated as shown a transition from a first schema 110 to a second schema 112 that is used to interact with the first and second database systems 104, 106. The transition, for instance, may involve an update to the application 108, use of a different application that is also configured to access the data, and so on. Thus, although a single application 108 is illustrated the application 108 may be representative of a plurality of applications.

The first and second database systems 104, 106 are configured to support at least one mechanism for access involving a schema that is not enforced by the respective databases. An example of this is illustrated as the first database system 104 including a first NoSQL database 114 having first schema data 116, i.e., data that is configured in accordance with the first schema 110. Likewise, the second database system 106 includes a second NoSQL database 118 having second schema data 120, i.e., data that is configured in accordance with the second schema 112 enforced by the application 108.

NoSQL databases are configured to employ mechanisms for storage and retrieval of data that is modeled using at least one technique other than a relational model, e.g., a Structured Query Language (SQL), and thus may also employ a SQL in some examples. The NoSQL databases are therefore representative of a variety of mechanisms other than a relational database that are usable to access corresponding data, such as a document mechanism, a column mechanism, a key-value mechanism, a graph mechanism, a multi-model mechanism, and so forth.

In a document mechanism, for instance, document stores are configured to encapsulate and encode data as a plurality of documents having self-describing hierarchical tree data structures that include maps, collections, and scalar values. Examples of such document configurations include extensible markup language (XML), a human-readable data serialization format such as YAML, JavaScript Object Notation (JSON), binary forms such as BSON used in a Mongo DB format, and so forth. The document stores include documents in a value part of a key/value store having the first and second schema data 116, 120 in this example. The documents stores may also support an application programming interface (API) or query language to retrieve the documents based on the data contained therein.

Because the first and second database systems 104, 106 support techniques that involve access using schemas that are not enforced by the databases itself, this complicates migration of data from compliance with the first schema 110 to the second schema 112 in conventional techniques. For example, rather than convert relational tables of a structured query language (SQL) schema that have specific definitions enforced by the database, the lack of such enforcement of a schema although aiding flexibility involves service downtime in that the application 108 can no longer access the data as the databases are taken down to perform the migration, data loss while the migration is done, and so on when using conventional techniques.

Accordingly, a schema migration module 122 is included in the environment 100 that is representation of functionality to migrate databases without downtime and also maintain synchronization of the data across both the original and new databases. For example, the schema migration module 122 is configured to migrate the first schema data 116 from the first NoSQL database 114 in compliance with the first schema 110 into the second schema data 120 of the second NoSQL database 118 in compliance with the second schema 112. The schema migration module 122 is configured to perform this migration while still making the data available to the application 108 and thus the application 108 remains online.

Further, the schema migration module 122 includes techniques to maintain synchronization, e.g., to address subsequent data received form the application 108 for storage in the databases, during the migration between the schemas. In this way, the migration does not have an adverse effect on access to the data and may be performed in a resource efficient manner.

As previously described, these techniques may also support use in a cloud environment. As such, the cloud environment may be implemented using a variety of regions, e.g., such that the application server system 102 and corresponding database systems are implemented in a first environment 124 (e.g., the United States) with second and third environments 126, 128 (e.g., Europe and Asia) having dedicated application server systems 102 and corresponding database systems. The migration techniques described herein may therefor address these different regions to maintain availability and synchronization of data. Further discussion of these and other examples are described in the following and shown in corresponding figures.

Figure 2:
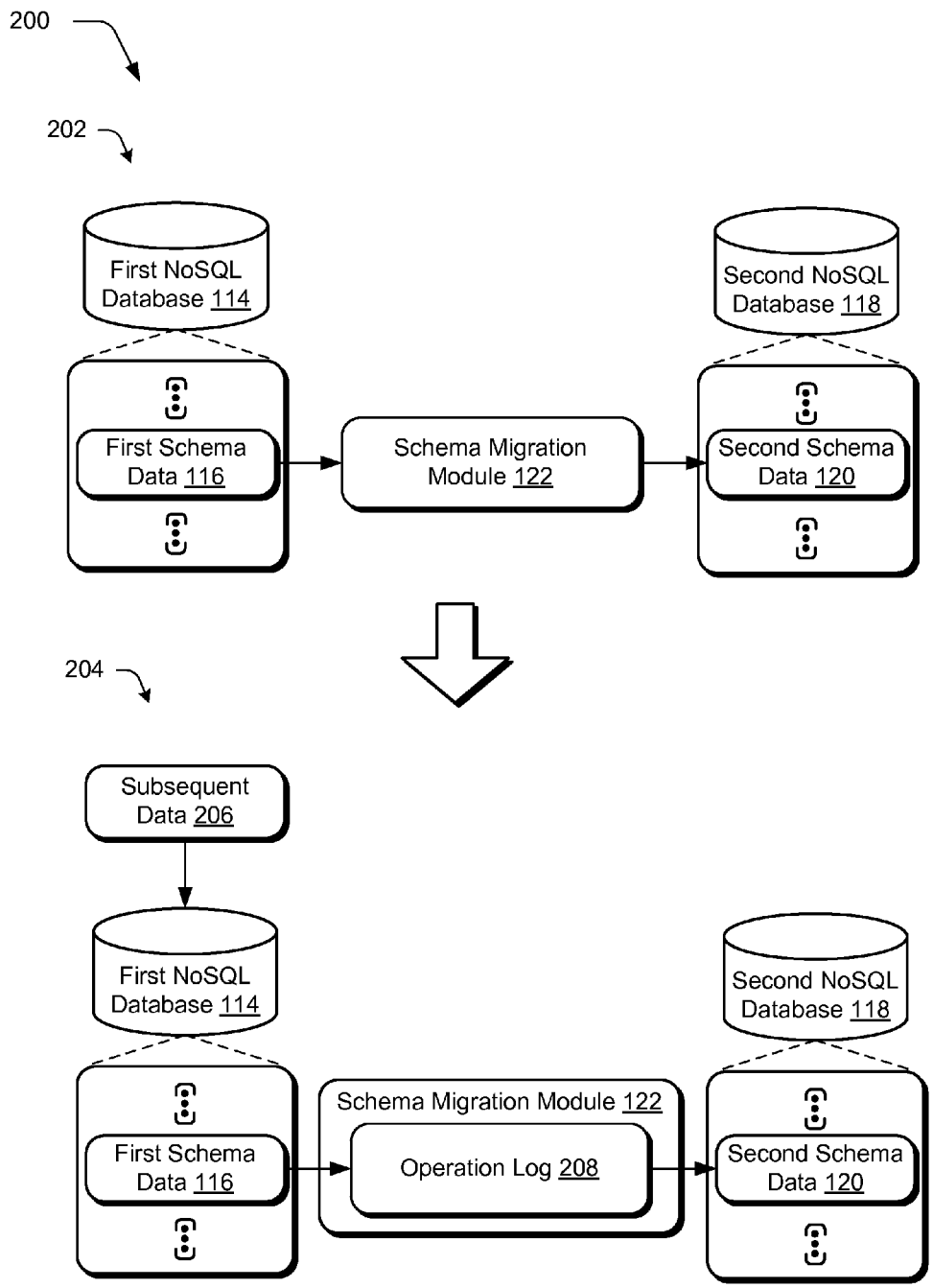
FIG. 2 depicts a system in an example implementation showing use of a schema migration module of FIG. 1 to initiate migration of data from a first schema to a second schema and maintain synchronization of the data during the migration.

FIG. 2 depicts a system 200 in an example implementation showing use of the schema migration module 122 to initiate migration of data from a first schema to a second schema and maintain synchronization of the data during the migration. This example is illustrated using first and second stages 202, 204. At the first stage 202, the schema migration module 122 initiates migration of existing first schema data 116 from the first NoSQL database 114 to transform it to be consistent with the second schema 112 as second schema data 120 in the second NoSQL database 118.

The schema migration module 122 when tasked with a document mechanism for storage and retrieval, for instance, may utilize one or more transforms that modify the data within documents of a data store, how the documents are arranged and access within the store (e.g., key values), self-describing hierarchical tree data structures within the documents, and so forth. Further, this migration may be performed by the schema migration module 122 separately from other components of the first and second database systems 104, 106 and thus operate in the background without adverse effect on these other components, e.g., memory controllers and so forth.

At the second stage 204, the schema migration module 122 employs a mechanism to keep the existing data and subsequently received data synchronized. For example, during the migration of the first NoSQL database 114 to the second NoSQL database 118, the first NoSQL database 114 may receive subsequent data 206 that is written to the database via a write operation. Write operations performed to the first NoSQL database 114 are described by an operation log 208.

Accordingly, the schema migration module 122 may use the operation log 208 to replay these write operations using transformed data for inclusion as second schema data 120 as part of the second NoSQL database 118. In this way, the second NoSQL database 118 is synchronized with the first NoSQL database 114 during the migration.

Figure 3:
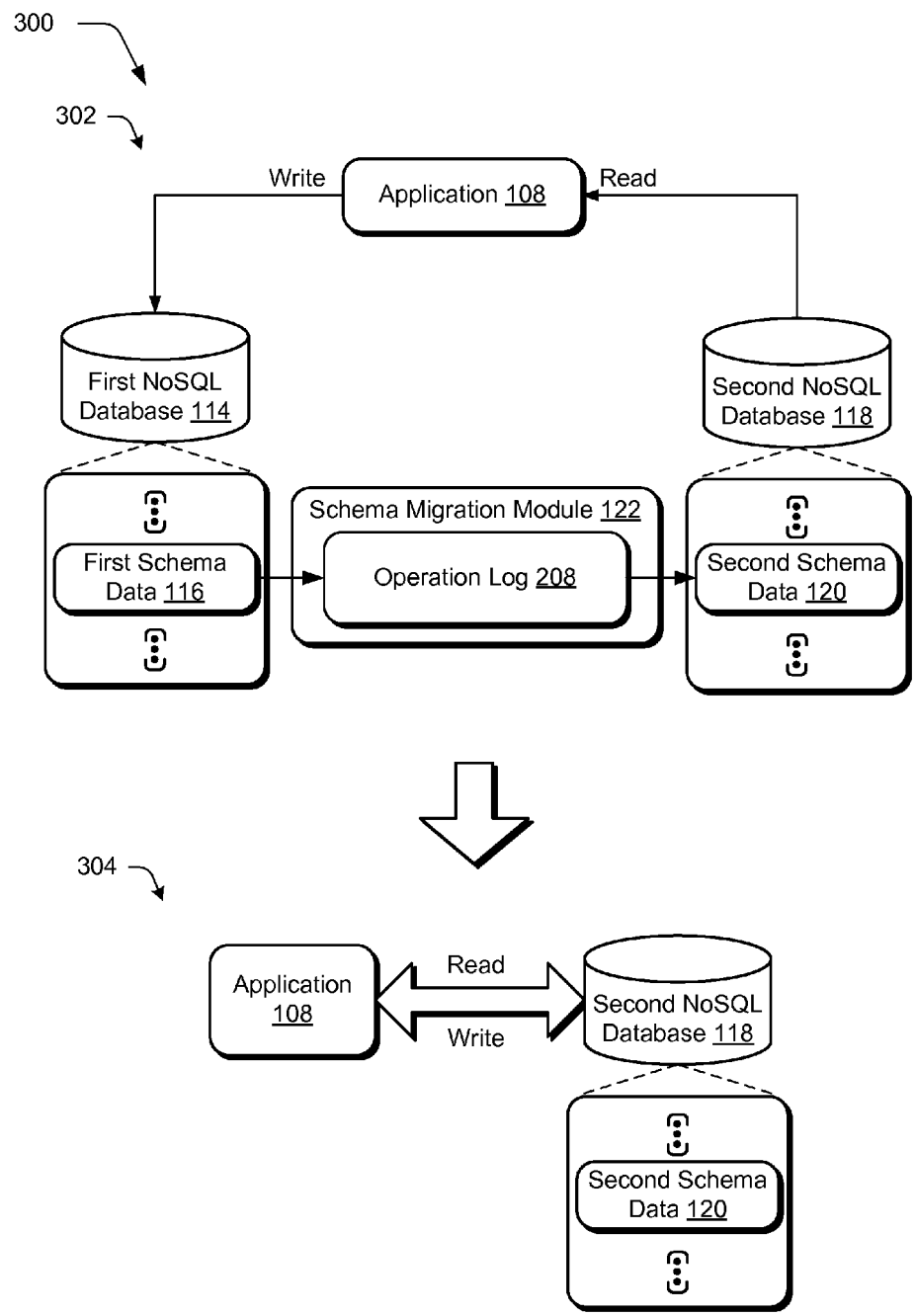
FIG. 3 depicts a system in an example implementation in which the migration of FIG. 2 is continued during which access of applications to the databases is controlled by the schema migration module.

FIG. 3 depicts a system 300 in an example implementation in which the migration of FIG. 2 is continued during which access of the application 108 to the databases is controlled by the schema migration module 122. This system 300 is also illustrated using first and second stages 320, 304. At the first stage 302, the schema migration module 122 controls access of the application 108 to the databases. This is performed by permitting write operation access for the application 108 to the first NoSQL database 114 (e.g., the original database) and read operation access for the application 108 to the second NoSQL database 118, e.g., the updated database.

Thus, in this example a read-first approach is used by the schema migration module 122 in which the application server system 102 of FIG. 1 is first limited to read operations from the new database and write operations into the old database during the migration performed by the schema migration module 122 in the background as described in FIG. 2. This addresses situations in which it is not feasible to deploy each of the application servers that implement the application 108 in a plurality of regions at the same time, further discussion of which is described in relation to FIG. 4.

At a point in time at which each of the applications 108 is configured to use the second schema 112 and migration of the first NoSQL database 114 is completed, the schema migration module 112 ceases the control of the first stage 302 and thus permits both read and write operations by the application to the second NoSQL database 118 as shown at the second stage 304. Thus, data is made available to the application 108 at all times by the schema migration module 112 during the first and second stages 202, 204, 302, 304 of FIGS. 2 and 3 without downtime and is synchronized and thus end-users of the application 108 are not impacted by the schema migration.

Figure 4:
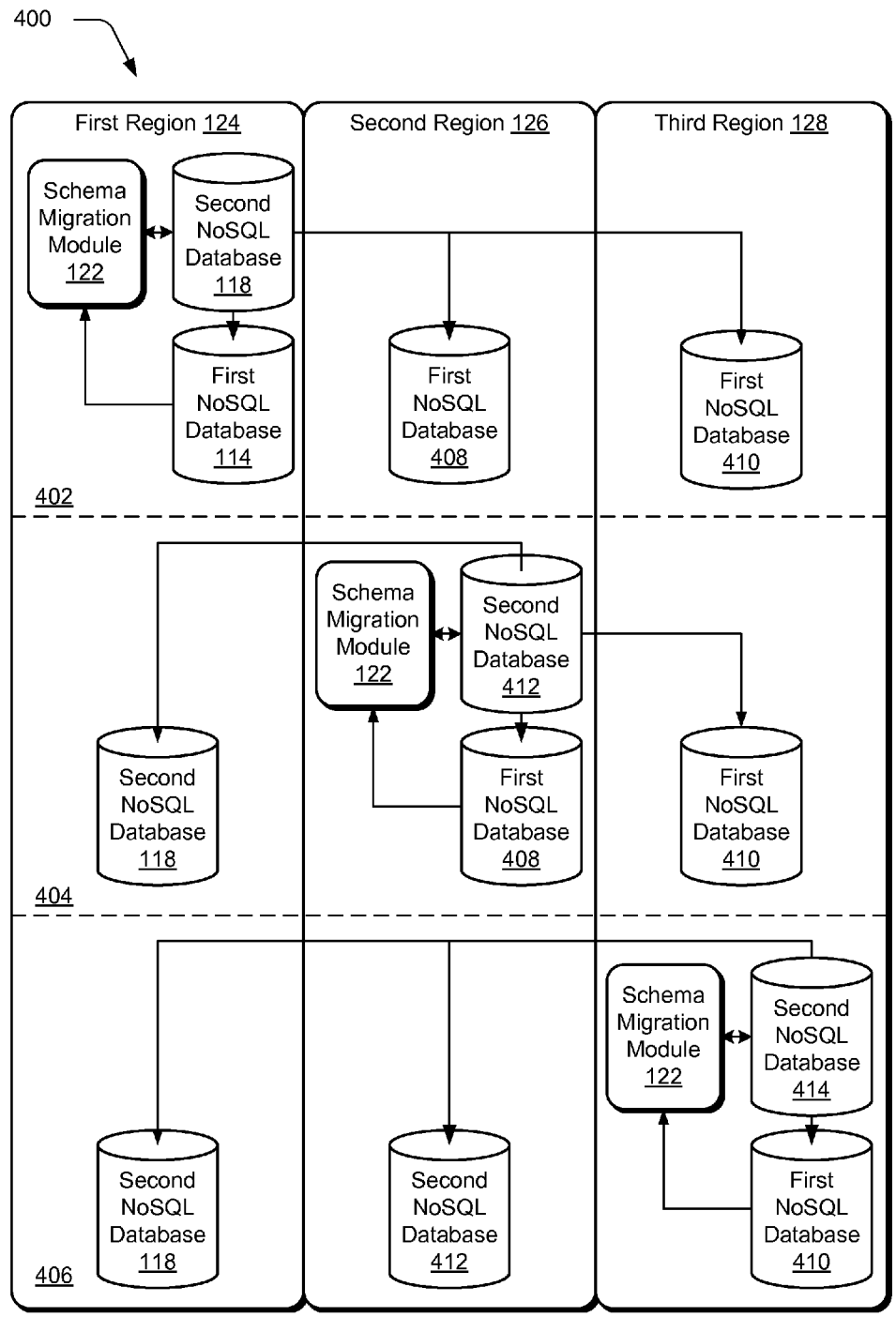
FIG. 4 depicts an example implementation of migration of schemas across regions that support deployment the application.

FIG. 4 depicts an example implementation 400 of migration of schemas across regions that support deployment the application 108. This implementation 400 is illustrated using first, second, and third stages 402, 404, 406. As previously described in relation to FIG. 1, the application 108 and corresponding application server system 102 and database systems are deployable in different geographic regions to support efficient access to the applications in those regions. Examples of these regions are illustrated as first, second, and third regions 124, 126, 128.

At the first stage 402, the schema migration module 122 migrates the first NoSQL database 114 to the second NoSQL database 118 as described in relation to FIGS. 2 and 3.

Writes are permitted to first NoSQL databases 408, 410 in the second and third regions 126, 128 as described above during this migration.

After completion of the migration in the first region 124, the schema migration module 122 performs the migration of the first NoSQL database 408 of the second region 126 to a second NoSQL database 412 also mimicking techniques as described in relation to FIGS. 2 and 3. In this example, write operations are permitted to the second NoSQL database 118 in the first region 124 and the first NoSQL database 410 of the third region 128.

Likewise, after completion of the migration in the second region 126, the schema migration module 122 performs the migration of the first NoSQL database 410 of the third region 128 to a second NoSQL database 414 also mimicking techniques as described in relation to FIGS. 2 and 3. In this example, write operations are permitted to the second NoSQL database 118 in the first region 124 and the second NoSQL database 412 of the second region 126. Once completed, write operations are permitted to the second NoSQL databases 118, 412, 414 in the first, second, and third regions 124, 126, 128 and thus may follow a "roll out" of the support of the second schema 112 by the application 108. In this way, the schema migration module 122 supports schema migration without downtime or data inconsistency, supports full schema migration beyond just schema evolution, and works in a cross-region environment. Further discussion of these and other techniques is described in relation to the following procedures.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

FIG. 5 depicts a procedure 500 in an example implementation in which migration of schemas of databases enforced by applications is performed without downtime. In this example, databases are migrated to comply with schemas enforced by one or more applications without downtime such that the data remains accessible to the one or more applications.

A transformation is initiated, by a schema migration module implemented by one or more computing devices, of a first database in compliance with a first schema into a second database in compliance with a second schema. The first and second schemas have mechanisms for storage and retrieval of data that is modeled using at least one technique other than a relational model (block 502). As previously described, a variety of different mechanisms may be employed, such as document mechanisms, column mechanisms, key-value mechanisms, graph mechanisms, multi-model mechanisms, and so on.

Access of the one or more applications is controlled by the schema migration module to the first and second databases during the transformation by limiting read operation access to the second database and write operation access to the first database during the transformation and synchronizing write operations made to the first database by replaying the write operations with corresponding transformed data into the second database (block 504). An example of this is illustrated at the first stage 302 of FIG. 3 in which the application 108 is permitted read access to the second NoSQL database 118 and write access is limited to the first NoSQL database 114.

Responsive to completion of the transformation of the data between the first and second databases, the control of the access by the schema migration module is ceased to permit read and write access by the one or more applications to the second database (block 506). In this way, a standalone component represented by the schema migration module 122 is configured to perform the schema migration in the background without downtime and maintains data consistency through synchronization.

Figure 6:
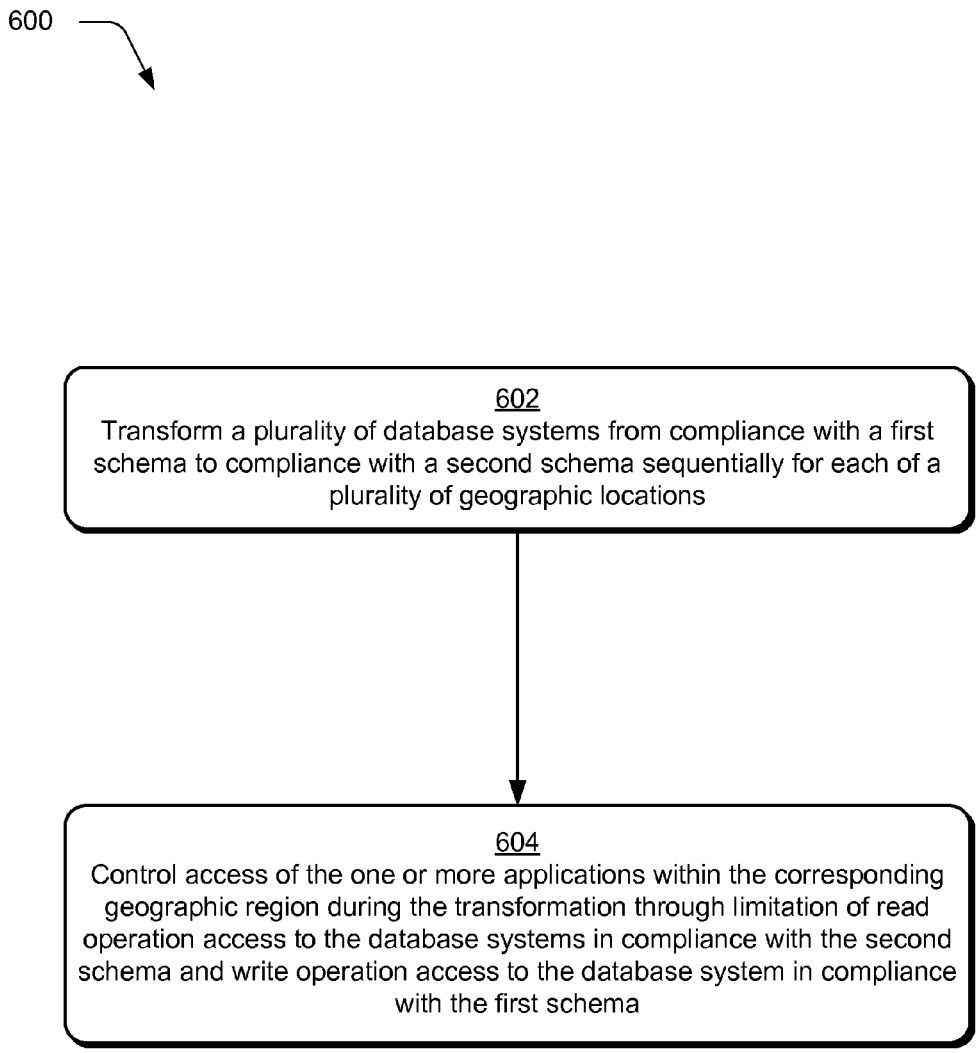
FIG. 6 is a flow diagram depicting a procedure in an example implementation in which schema migration involving geographic regions is performed.

FIG. 6 depicts a procedure 600 in an example implementation in which schema migration involving geographic regions is performed. As shown in FIG. 4, a system is described of migrating data in an environment having a plurality of regions of database systems from compliance with a first schema to a second schema enforced by one or more applications without downtime. The system includes a plurality of database systems associated with corresponding geographic regions. As above, each of the database systems having mechanisms for storage and retrieval of data that is modeled using at least one technique other than a relational model.

A schema migration module, implemented by one or more computing devices, transforms the plurality of database systems from compliance with the first schema to compliance with the second schema sequentially for each geographic location (block 602). The schema migration module 122, for instance, may operate as a standalone component sequentially for first, second, and third regions 124, 126, 128.

The schema migration module controls access of the one or more applications during the transformation through limitation of read operation access to the database systems in compliance with the second schema and write operation access to the database system in compliance with the first schema (block 604). As described above, this may be used to permit operation of the schema migration module 122 in the background. Further, as this is performed by geographic region complications due to lag of network communications are minimized and even avoided.

Example System and Device

Figure 7:
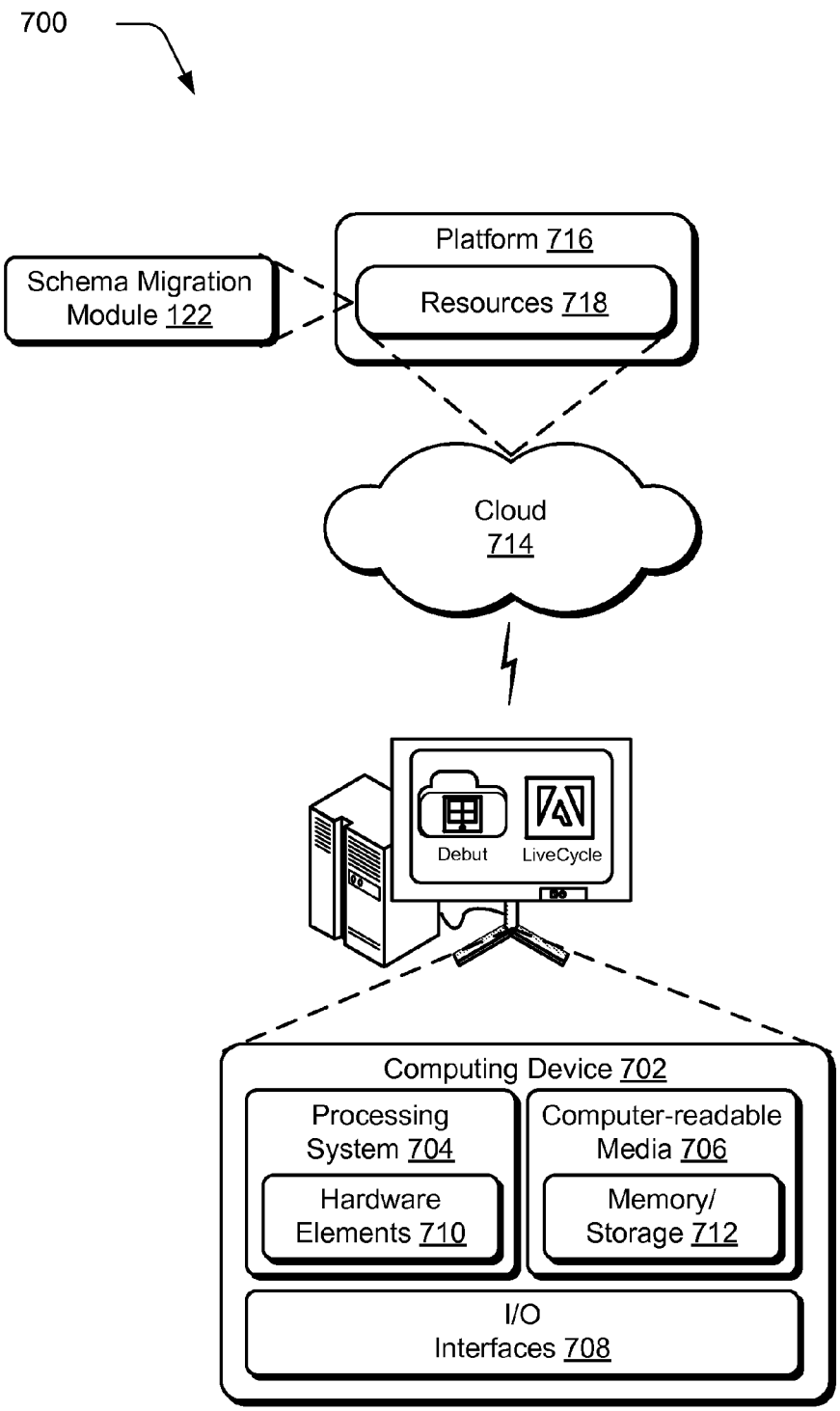
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the schema migration module 122. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware.

Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of migrating databases to comply with schemas enforced by one or more applications without downtime such that the data remains accessible to the one or more applications, the method comprising:
   initiating a transformation, by a schema migration module implemented by one or more computing devices, of a first database in compliance with a first schema into a second database in compliance with a second schema, the first and second schemas having mechanisms for storage and retrieval of data that is modeled using at least one technique other than a relational model;
   controlling access of the one or more applications by the schema migration module to the first and second databases during the transformation by:
      permitting read operations access to the second database and not the first database during the transformation;
      permitting write operations access to the first database and not the second database during the transformation; and
      synchronizing write operations made to the first database by replaying the write operations with corresponding transformed data into the second database; and
   responsive to completion of the transformation of the data between the first and second databases, ceasing the controlling of the access by the schema migration module to permit read and write access by the one or more applications to the second database.

2. The method as described in claim 1, wherein the first and second databases are configured as Not Only Structured Query Language (No SQL) databases.

3. The method as described in claim 1, wherein the first and second databases do not enforce a schema absent the one or more applications.

4. The method as described in claim 1, wherein the first and second databases have document stores configured to encapsulate and encode data as a plurality of documents having self-describing hierarchical tree data structures and the transformation includes transformation of the plurality of documents.

5. The method as described in claim 1, wherein the mechanisms for storage and retrieval of data include a column mechanism, a key-value mechanism, a graph mechanism, or a multi-model mechanism.

6. The method as described in claim 1, wherein the access by the one or more applications using the at least one mechanism to the first and second databases is performed without converting in-memory structures of the applications to relational structures.

7. The method as described in claim 1, wherein the relational model is tabular relations of a Structured Query Language (SQL).

8. The method as described in claim 1, wherein the synchronizing of the writes is performed using an operation log of the first database that stores the write operations to replicate the write operations to the second database.

9. The method as described in claim 1, wherein the first and second databases are included in a first region and further comprising responsive to completion of the transformation of the data, repeating the initiating and the controlling for one or more other databases in a second region that also includes the data.

10. A system of migrating document stores to comply with schemas enforced by one or more applications without downtime such that the data remains accessible to the one or more applications, the system comprising:
    a first database system having one or more document stores configured to encapsulate and encode data as a plurality of documents having self-describing hierarchical tree data structures in compliance with a first schema enforced by the one or more applications;
    a second database system having one or more document stores configured to encapsulate and encode data as a plurality of documents having self-describing hierarchical tree data structures in compliance with a second schema enforced by the one or more applications; and
    a schema migration module, implemented by one or more computing devices, to control access of the one or more applications to the first and second databases during transformation of the data in the one or more document stores of the first database system to the one or more document stores of the second database system by permission of read operation access to the second database system and not the first database system during the transformation and permission of write operation access to the first database system and not the second database system during the transformation and synchronization of write operations made to the first database system by replaying the write operations with corresponding transformed data into the second database system using an operational log.

11. The system as described in claim 10, wherein the first and second database systems include Not Only Structured Query Language (No SQL) databases.

12. The system as described in claim 10, wherein the first and second database systems do not enforce a schema absent the one or more applications.

13. The system as described in claim 10, wherein the access by the one or more applications using the at least one mechanism to the first and second database systems is performed without converting in-memory structures of the applications to relational structures.

14. The system as described in claim 10, wherein the synchronization of the write operations is performed using the operation log of the first database system that stores the write operations performed on the first database system to replicate the write operations to the second database system.

15. The system as described in claim 10, wherein the first and second database systems are included in a first region and further comprising a second region having one or more other database systems and that implement the schema migration module to migrate the data in the one or more other database systems to the second schema from the first schema.

16. A system of migrating data in an environment having a plurality of geographic regions of database systems from compliance with a first schema to a second schema enforced by one or more applications without downtime, the system comprising:
    a plurality of database systems associated with corresponding said geographic regions, each of the database systems having mechanisms for storage and retrieval of data that is modeled using at least one technique other than a relational model; and
    a schema migration module, implemented by one or more computing devices, to transform the plurality of database systems from compliance with the first schema to compliance with the second schema sequentially for each said geographic location and control access of the one or more applications within the corresponding said geographic region during the transformation through permission of read operation access to the database systems in compliance with the second schema and not in compliance with the first schema and permission of write operation access to the database system in compliance with the first schema and not in compliance with the second schema.

17. The system as described in claim 16, wherein the plurality of database systems include databases configured as Not Only Structured Query Language (No SQL) databases.

18. The system as described in claim 16, wherein the plurality of database systems include databases that do not enforce a schema absent the one or more applications.

19. The system as described in claim 16, wherein the mechanisms for storage and retrieval of data include a column mechanism, key-value mechanism, graph mechanism, or multi-model mechanism.

20. The system as described in claim 16, wherein the plurality of database systems include databases having one or more document stores configured to encapsulate and encode data as a plurality of documents having self-describing hierarchical tree data structures.

* * * * *